United States Patent
Hermansson

(10) Patent No.: US 7,204,544 B2
(45) Date of Patent: Apr. 17, 2007

(54) APPARATUS FOR OPENING AND CLOSING A SLIDING DOOR

(76) Inventor: Sonnie Hermansson, Kalvhed 2185, SE-460 20, Sjuntorp (SE)

(*) Notice: Subject to any disclaimer, the term of this patent is extended or adjusted under 35 U.S.C. 154(b) by 130 days.

(21) Appl. No.: 10/520,654

(22) PCT Filed: Jul. 16, 2003

(86) PCT No.: PCT/SE03/01218

§ 371 (c)(1),
(2), (4) Date: Jan. 10, 2005

(87) PCT Pub. No.: WO2004/009939

PCT Pub. Date: Jan. 29, 2004

(65) Prior Publication Data

US 2005/0252089 A1 Nov. 17, 2005

(30) Foreign Application Priority Data

Jul. 18, 2002 (SE) .................................... 0202266

(51) Int. Cl.
*B60J 5/06* (2006.01)
(52) U.S. Cl. .................................. 296/155; 49/360
(58) Field of Classification Search ............. 296/155; 49/213, 358, 360, 362
See application file for complete search history.

(56) References Cited

U.S. PATENT DOCUMENTS

| 4,640,050 A | 2/1987 | Yamagishi |
| 5,046,283 A | 9/1991 | Compeau |
| 5,316,365 A | 5/1994 | Kuhlman |
| 5,507,119 A | 4/1996 | Sumiya |
| 6,256,930 B1 * | 7/2001 | Faubert et al. ............. 49/362 |
| 6,435,600 B1 * | 8/2002 | Long et al. ............... 296/155 |

* cited by examiner

*Primary Examiner*—Lori L. Coletta
(74) *Attorney, Agent, or Firm*—Jeffrey S. Melcher; Manelli Denison & Selter, PLLC

(57) ABSTRACT

The invention relates to an apparatus (1) for opening and closing a door (2) which is arranged so that it can slide on a vehicle (3). The apparatus comprises an engaging element (5), such as a cable, connected to the door (2), and a drive wheel (6) designed to act upon the engaging element (5). A transmission (7) is operatively connected to the drive wheel (6) and the transmission (7) is designed to transmit power to the drive wheel (6) via at least a first gear and a second gear. In one embodiment the transmission may have a neutral position so that the drive wheel (6) can rotate freely. A position sensor (8) is connected to the sliding door (2) in order to detect when the sliding door (2) has reached a predetermined position in the door opening. The transmission (7) then changes gear from the first gear to the second gear. The invention also relates to a vehicle provided with the apparatus according to the invention and to a method of fitting the apparatus according to the invention to a vehicle.

15 Claims, 11 Drawing Sheets

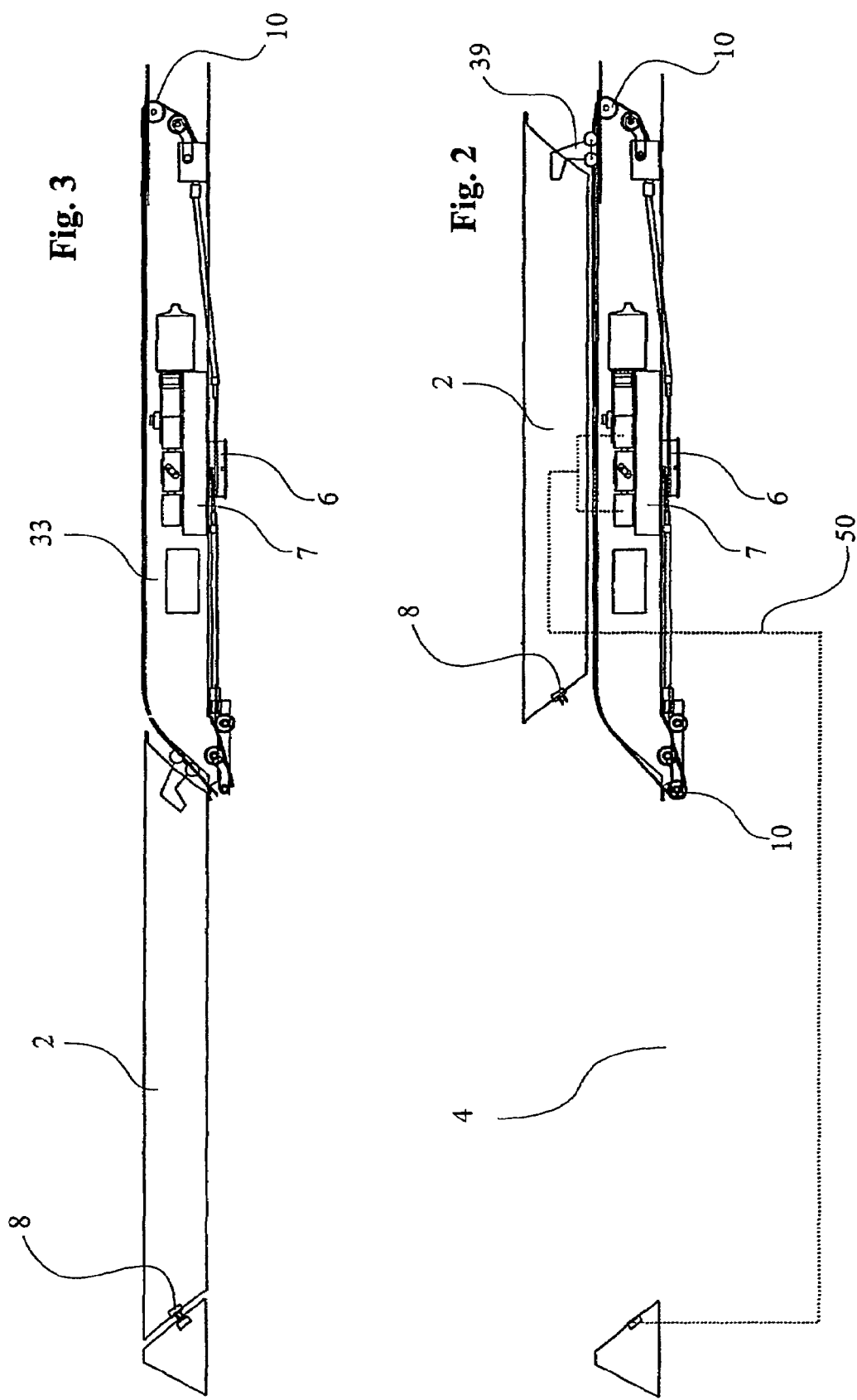

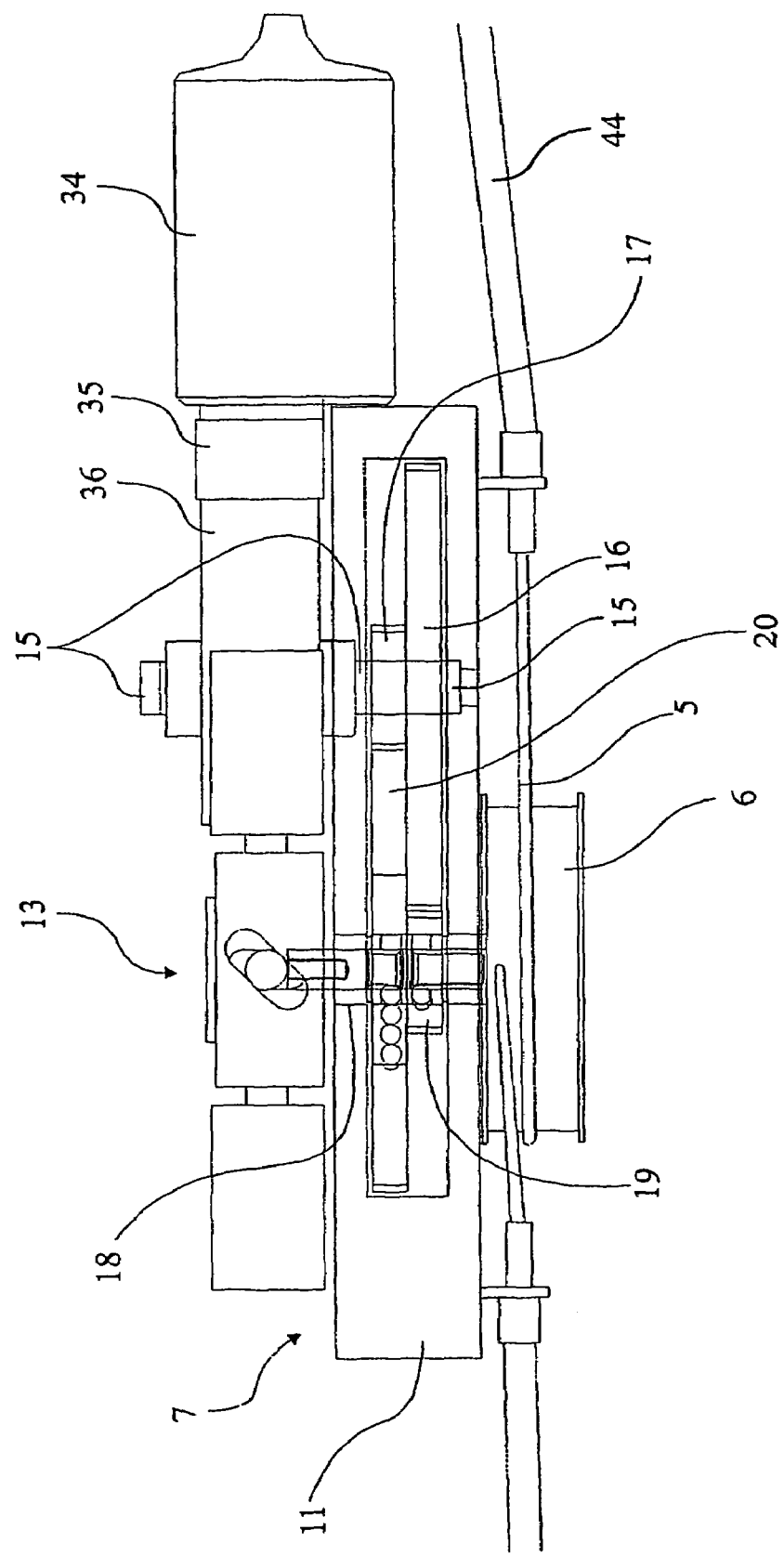

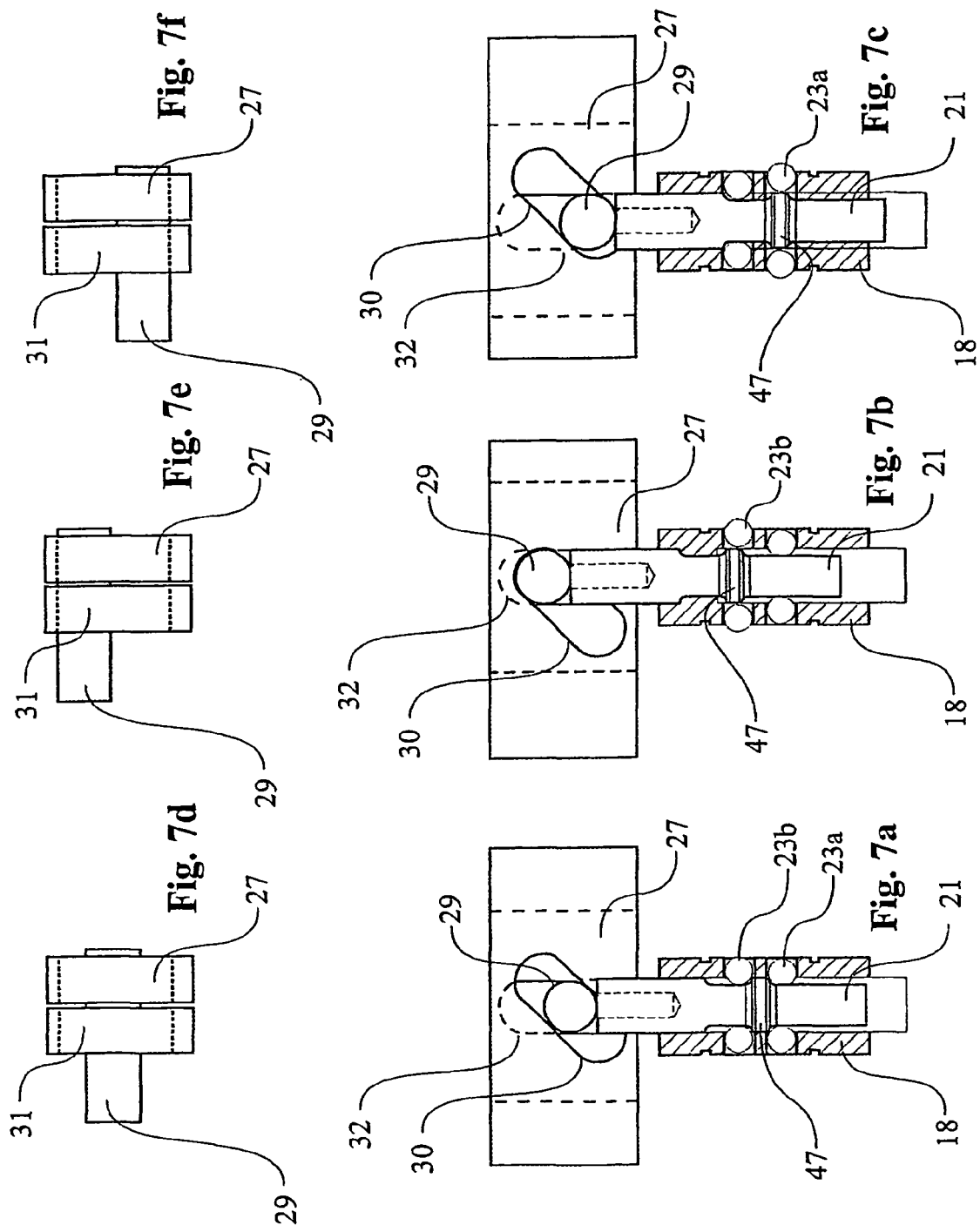

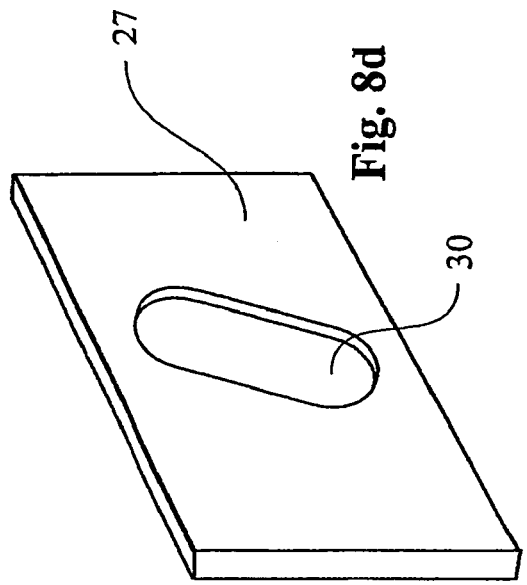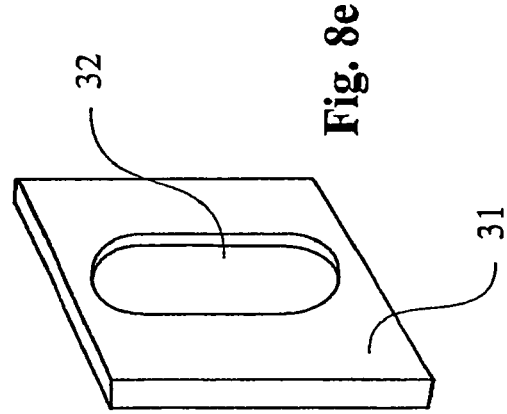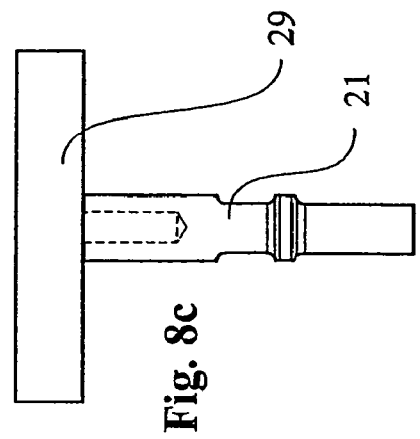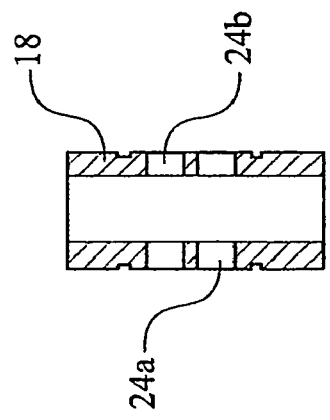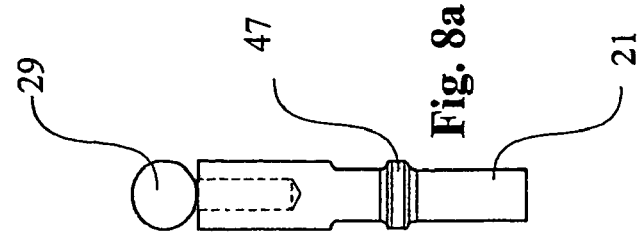

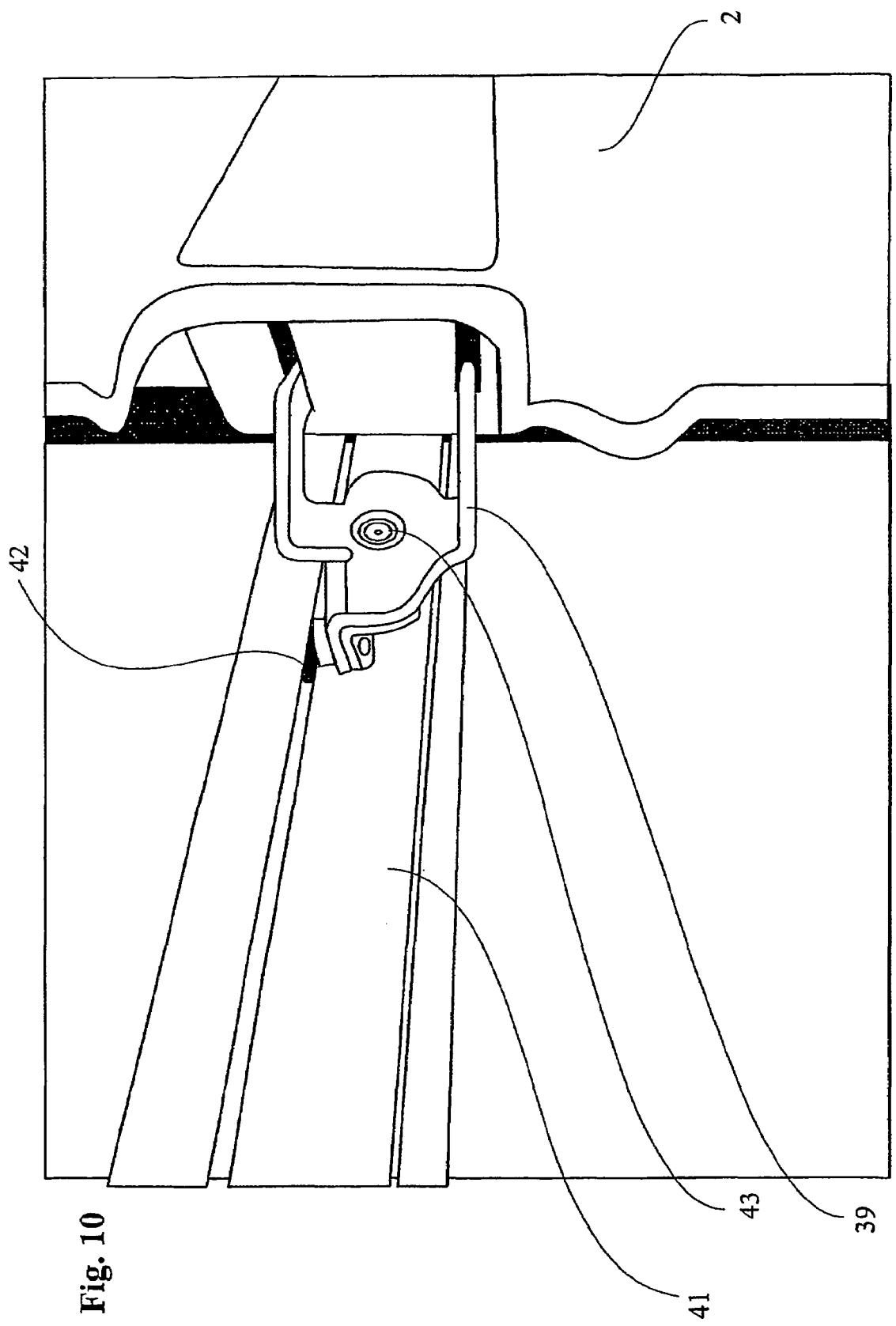

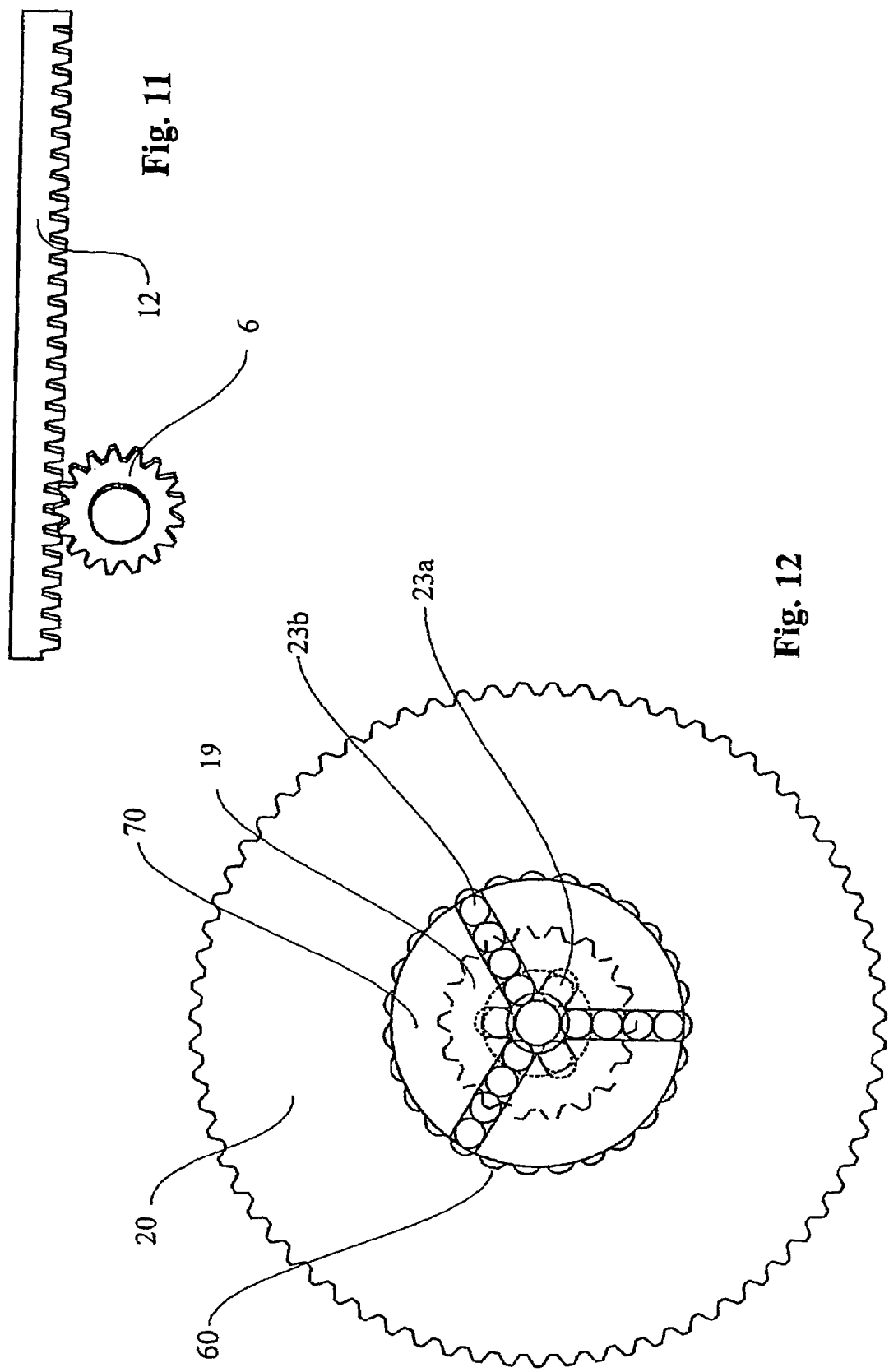

APPARATUS FOR OPENING AND CLOSING A SLIDING DOOR

TECHNICAL FIELD

The present invention relates to an apparatus for opening and closing a door, which is arranged on a vehicle so that it can slide in a door opening on the vehicle between an open position and a closed position.

BACKGROUND OF THE INVENTION

On sliding doors for so-called minibuses and elsewhere there is a demand for power door functions. The desired characteristics of a power door opening are wide-ranging. Examples of the desired characteristics include the requirement that the opening time should be relatively short, approximately 4–8 seconds, and that the available power must be sufficient both to close and to open the door even when the vehicle is standing on an inclined plane. Furthermore it must be possible to open the door manually, in the absence of power or in an emergency, for example. A power opening and closing apparatus should furthermore be easy to install on a number of different vehicles or types of vehicle. Various examples of apparatus for opening and closing sliding doors are demonstrated, for example, in U.S. Pat. No. 4,640,050, U.S. Pat. No. 5,316,365, U.S. Pat. No. 5,809,696, U.S. Pat. No. 5,833,302, U.S. Pat. No. 6,038,818, U.S. Pat. No. 5,233,789, U.S. Pat. No. 5,046,283, U.S. Pat. No. 4,887,390 and GB 2 309 500.

In opening and closing a vehicle sliding door it may be desirable for the door to move relatively quickly over the greater part of its travel. As stated above, it should be possible to open the door in 4 to 8 seconds and the same naturally also applies to closing. In order that the door should move quickly it is suitably power-driven in a high gear. A high gear is also desirable for another reason. In view of the risk of crush injuries it is advisable that the door should not close with excessive force. As is well-known, a higher gear produces a smaller force. However, a relatively high force is required in order to finally close the door so that the door locks correctly. In order to obtain a high force it is advisable to power the door in a low gear. It may be desirable, then, to power the door in a high gear for the greater part of the distance travelled by the door between the open and closed position, before then switching to a lower gear when the door nearly reaches its closed position.

U.S. Pat. No. 5,046,283 proposes a power mechanism for opening and closing a sliding door or sliding window on a vehicle, for example. A cable is shown attached to a door and led through the body of the vehicle by way of pulleys, so that the door slides towards an open position when one end of the cable is pulled and towards a closed position when the other end of the cable is pulled. The ends of the cable are wound around a first reel and a second reel, which are arranged concentrically. It is furthermore specified that each of the reels has a large-diameter section on which the cable is wound in order to impart a relatively high speed and low force to the door movement, and a small-diameter section in order to impart a relatively low speed and high force to the door movement over a smaller part of the door travel in proximity to the closed position. It is stated that as a result of this the door can be opened and closed at a high speed over the greater part of the distance travelled by the door between the open and closed position, but that it can move with great force in order to close the door.

In the apparatus described in U.S. Pat. No. 5,046,283, it is stated that the larger diameter section of the reel has a groove 150 for the cable whilst the smaller diameter section of the reel has a groove 160 for the cable. A further groove (ramp groove) 162 joins the larger diameter groove 150 to the smaller diameter groove 160. When the apparatus is in operation, the cable is wound on the helical groove 156 on the larger diameter section. When the door is approaching the closed position the cable goes over the other groove and continued rotation of the reel causes the cable to start being reeled up on to the cable groove situated on the smaller diameter section.

For its function this previously known apparatus is dependent on the cable having moved a certain length, so that a specific length has been reeled up on to or reeled off from a reel. This apparatus must therefore be specially adapted to each type of vehicle in which it is used.

An object of the present invention therefore is to provide an apparatus for opening and closing a vehicle sliding door, which will allow the door to move at high speed over the greater part of the distance between the open position and the closed position and will allow the door to be closed with great force. The apparatus must be easily adaptable to different types of vehicle. A further object is to provide an apparatus, which will permit release in the absence of power, for example. This is a safety requirement in the event of fire, for example. A further object is to provide an apparatus which can easily be retrofitted to various types of vehicle of different sizes and which can furthermore be located at various positions in a vehicle. Another object is to provide an opening and closing apparatus which does not take up as much space and which does not encroach on the vehicle interior.

SUMMARY OF THE INVENTION

The invention relates to an apparatus for opening and closing a door, which is arranged on a vehicle so that it can slide in a door opening in the vehicle. The apparatus comprises an engaging element connected to the door and a drive wheel designed to act upon the engaging element.

A transmission is operatively connected to the drive wheel. The transmission is designed to transmit power to the drive wheel via at least a first gear and a second gear so that the drive wheel can be driven in a first gear and a second gear. The first gear is a higher gear and the second gear is a lower gear. In a preferred embodiment the transmission furthermore has a neutral position so that the drive wheel can rotate freely. A position sensor is arranged in connection with the sliding door or in the vehicle door opening in order to detect when the sliding door has reached a predetermined position in the door opening. The position sensor is operatively connected to the transmission so that the transmission changes gear from the first gear to the second gear when the door, in moving towards a closed position, reaches the predetermined position.

In an advantageous embodiment the engaging element comprises a cable designed to run around pulleys arranged on the vehicle and around the drive wheel. The transmission may be arranged in a housing, the drive wheel being arranged outside the transmission housing. The engaging element may also comprise a geared rack, in which case the drive wheel may be a pinion.

According to an advantageous embodiment the position sensor is operatively connected to the transmission in that when the door, in moving towards the closed position of the door, reaches the predetermined position, the position sensor is designed to act upon a transmission control device. The control device can then be designed to change from the first gear to the second gear when the position sensor closes or breaks an electrical circuit.

The transmission is preferably a gearbox, which comprises an input drive shaft. On the input drive shaft there is a first gearwheel and a second gearwheel, which is smaller than the first gearwheel, so that the first gearwheel constitutes a larger gearwheel and the second gearwheel a smaller gearwheel. The gearbox furthermore comprises an output drive shaft. On the output drive shaft there is a third gearwheel meshing with the first gearwheel to produce the first gear, and a fourth gearwheel meshing with the second gearwheel to produce the second gear. The fourth gearwheel is larger than the third gearwheel so that the third gearwheel constitutes a smaller gearwheel and the fourth gearwheel a larger gearwheel.

The control device is designed to control the transmission of torque from the input drive shaft to the output drive shaft either via the first and the third gearwheel or via the second and the fourth gearwheel.

The control device may suitably be designed as follows. The output drive shaft is a hollow shaft and the control device comprises a wedge device, which is arranged inside the drive shaft and is moveable in the drive shaft in the axial direction of the drive shaft. Between the output drive shaft and the third gearwheel there is a first coupling, which comprises coupling elements arranged in the output drive shaft and designed to be pressed radially outwards through openings in the output drive shaft to engage with the third gearwheel, so that the output drive shaft is thereby torsionally locked to the third gearwheel. The coupling elements are thereby designed to interact with the wedge device, so that the wedge device can press the coupling elements radially outwards. Between the output drive shaft and the fourth gearwheel there is a second coupling. The second coupling comprises coupling elements arranged in the output drive shaft. The coupling elements are designed to be pressed radially outwards through openings in the output drive shaft to engage with the fourth gearwheel, so that the output drive shaft is thereby torsionally locked to the fourth gearwheel. The coupling elements are designed to interact with the wedge device so that the wedge device can press the coupling elements radially outwards. The control device furthermore comprises means for displacing the wedge device axially in the output drive shaft, so that the wedge device can actuate either the first coupling or the second coupling.

The means in the control device for axial displacement of the wedge device may suitably comprise a shuttle, moveable in a direction perpendicular to the axial direction of the drive shaft. On either side of the shuttle there is suitably an electromagnet, which is designed to attract the shuttle. On the wedge device there is a pin, which can be used to control the movement of the wedge device. On the shuttle there is a first groove having an extension both parallel to the output drive shaft and perpendicular thereto. The pin of the wedge device is designed to engage in this first groove. There is furthermore a fixed guide plate having a second groove extending parallel to the output shaft. The pin of the wedge device is also designed to engage in this second groove, so that movement of the shuttle perpendicular to the axial direction of the drive shaft displaces the wedge device axially in the output drive shaft. The position sensor is connected to the electromagnets so that each electromagnet is activated or deactivated as a function of the position of the sliding door.

The invention also relates to a vehicle having a body, the vehicle body being formed so that a door opening is defined by the body, and a door which is capable of sliding in the door opening between an open position of the door and a closed position. The vehicle according to the invention further comprises an apparatus for opening and closing the sliding door. The said apparatus comprises a cable connected to the door and designed to run around pulleys arranged on the vehicle, and a drive wheel designed to act on the cable.

The vehicle further comprises a gearbox, which is operatively connected to the drive wheel. The transmission is designed to transmit power to the drive wheel via at least a first gear and a second gear so that the drive wheel can be driven in a first gear and a second gear. The first gear is a higher gear and the second gear is a lower gear and in a preferred embodiment the transmission furthermore has a neutral position so that the drive wheel can rotate freely. A position sensor is arranged in connection with the sliding door or in the vehicle door opening and designed to detect when the sliding door has reached a predetermined position in the door opening. The sensor is operatively connected to the transmission so that the transmission changes gear from the first gear to the second gear when the door, in moving towards a closed position, reaches the predetermined position.

Finally the invention relates to a method of fitting an apparatus for opening and closing a door. The method consists of providing a vehicle with a door opening in which a door is designed to slide between an open position and a closed position. A cable is furthermore provided together with pulleys intended for the cable, the said cable and pulleys being fitted to the vehicle so that the cable is arranged on the vehicle to run around the pulleys. A drive wheel is furthermore fitted to the vehicle for interaction with the cable. A transmission is provided, which has a first gear and a second gear and preferably also a neutral position. The transmission is fitted in connection with the drive wheel, so that the transmission is operatively connected to the drive wheel. The drive wheel can then be driven in a first gear or a second gear or can rotate freely in the neutral position if the transmission is a transmission which has a neutral position. A control device is fitted in connection with the transmission, so that the control device can act on the transmission in order to change its gear from the first gear to the second gear. A position sensor is fitted in the door opening and a connection is established between the position sensor and the control device, so that the control device can be activated by the position sensor when the sliding door has reached a certain position.

BRIEF DESCRIPTION OF THE DRAWINGS

FIG. 2 shows a section through the apparatus according to the invention viewed from above and fitted to a sliding door, which in the figure is in an open position.

FIG. 3 shows the same as FIG. 2 but here with the door in a position in which the door is almost fully closed.

FIG. 4 shows the location of the transmission and the transmission control device.

FIG. 7a–7f shows some details of the control device shown in FIG. 5.

FIG. 8a–8e separately shows some details of the control device.

FIG. 10 shows a perspective view of a part of the detail shown in FIG. 9.

FIG. 11 shows a detail of an alternative embodiment.

FIG. 12 shows some of the details shown in FIG. 7a–7c in a section perpendicular to the cross-section shown in FIG. 7a.

DETAILED DESCRIPTION OF THE INVENTION

Figure 1:
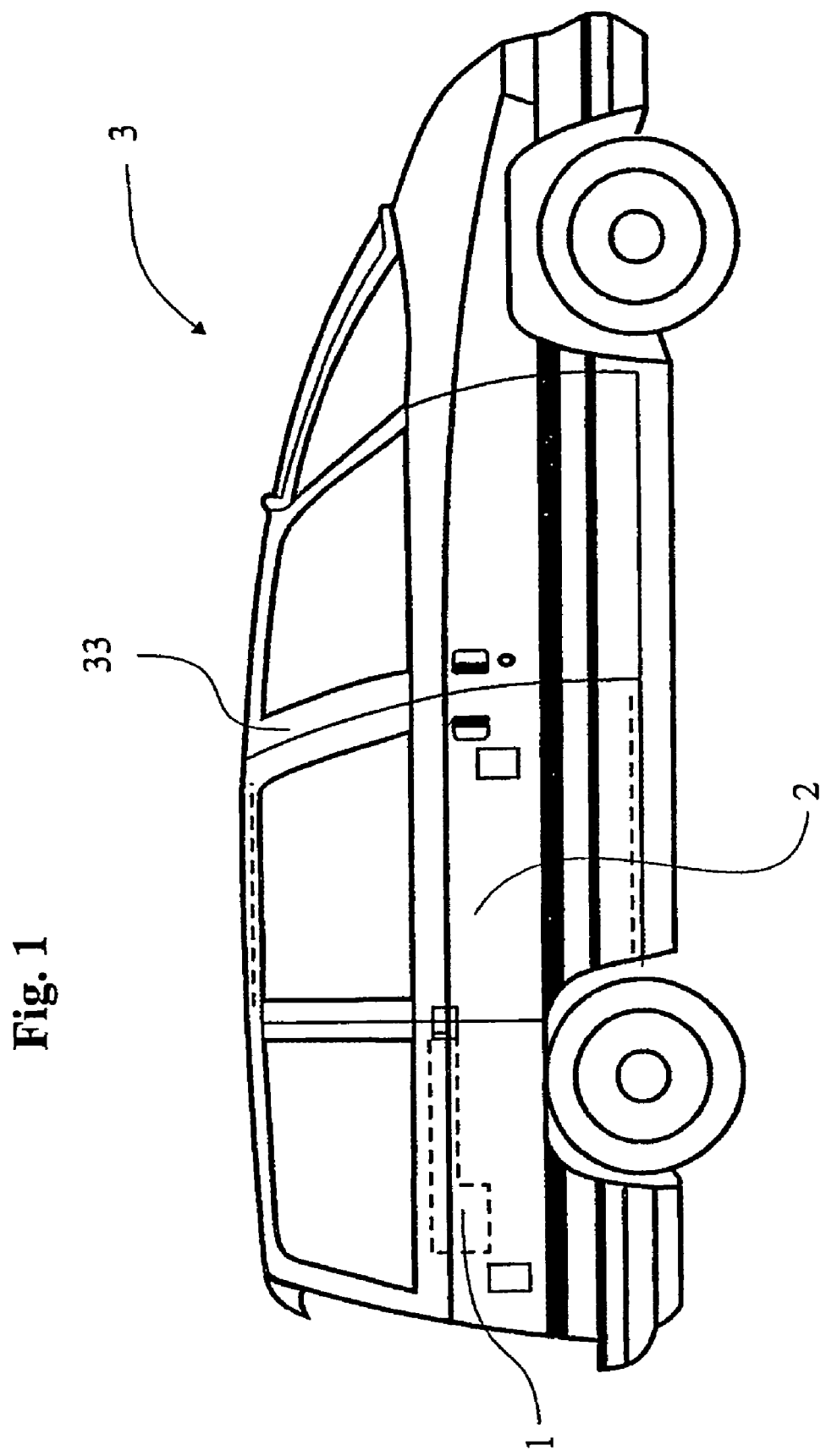
FIG. 1 shows a vehicle provided with a sliding door and an apparatus according to the invention for opening and closing the door.
Figure 9:
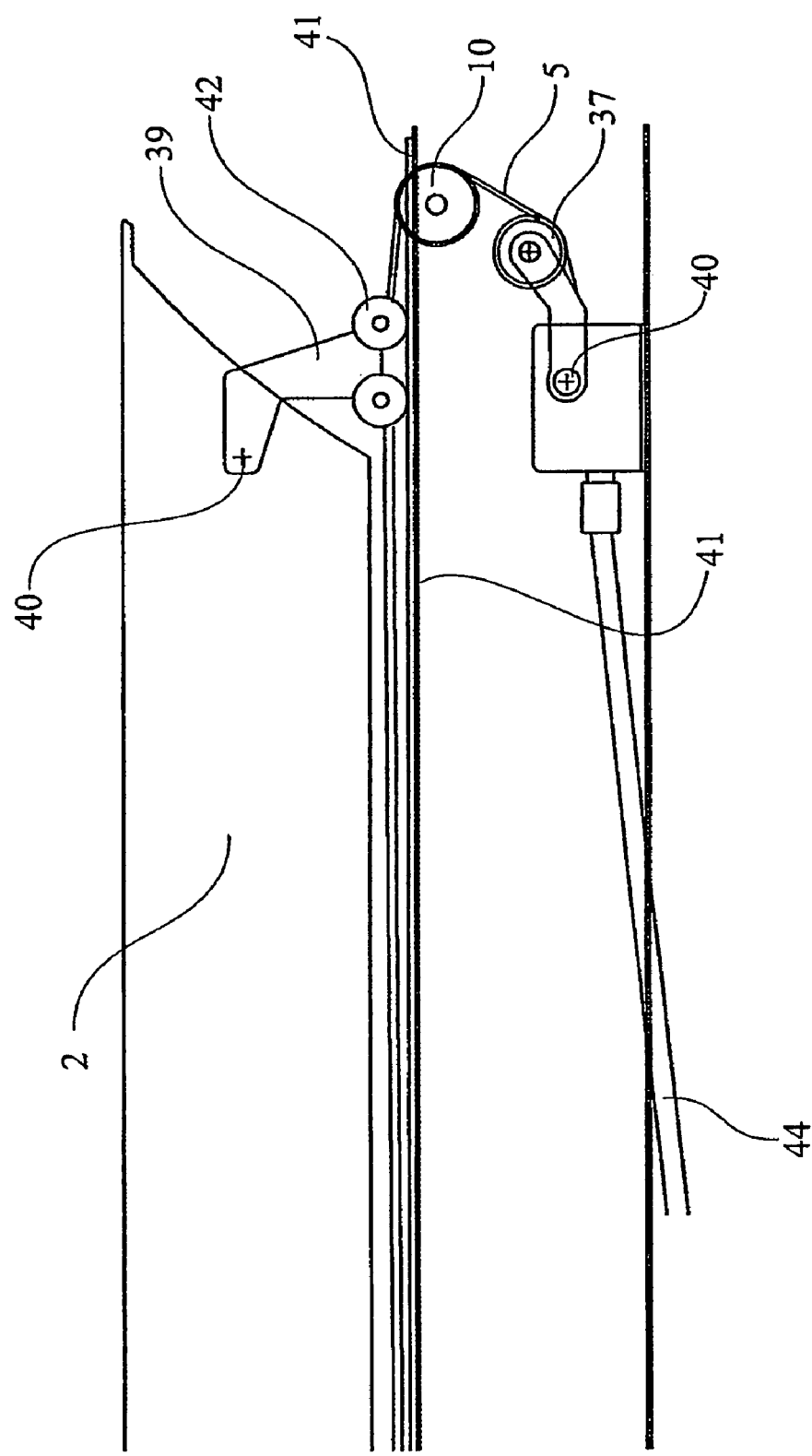
FIG. 9 shows a detail from FIG. 2 on a larger scale.

FIG. 1 shows a vehicle 3, which has a body 33 having a door opening for a sliding door 2. The vehicle 3 has an apparatus 1 for opening and closing the door 2, which is arranged on the vehicle 3 so that it can slide in the door opening 4 of the vehicle 3. As will be seen from FIG. 2, FIG. 3 and FIG. 9 and elsewhere, the apparatus according to the invention comprises an engaging element 5, which is connected to the door 2 and which in an advantageous embodiment consists of a cable, for example a steel cable. A drive wheel 6 is designed to act on the engaging element 5 so that the door 2 can thereby be opened and closed. If the engaging element 5 comprises a cable 5 the drive wheel 6 may act on the engaging element in that the cable 5 runs around the drive wheel 6. When the drive wheel 6 rotates, the cable 5 moves as therefore also does the door. The drive wheel 6 is preferably designed to rotate about an essentially horizontal axis. This affords the advantage that the apparatus takes up less space in a horizontal direction. The cable 5 runs through the vehicle body to a carriage 39, which can be seen from FIG. 2 and FIG. 9. The carriage 39, as will be seen from FIG. 9, is fixed to the door 2 by an articulated fastening 40. The carriage 39 has wheels 42, which are designed to run on a groove or a rail 41 on the outside of the body. The cable 5 is firmly connected to the carriage 39. The cable 5 is shown running over a tensioner 37, which has an articulated joint 40. The cable 5 can thereby be tensioned. FIG. 10 shows a perspective view of the carriage 39 from behind. In FIG. 10 it is also indicated that the carriage 39 has a further wheel 43, which is arranged perpendicular to the plane of the wheel 42. The further wheel 43 also runs against the rail 41, which may be an extruded profile rail.

A transmission 7 is operatively connected to the drive wheel 6. The transmission 7 is designed to transmit power to the drive wheel 6 via at least a first gear and a second gear, so that the drive wheel 6 can be driven in a first gear and a second gear. The first gear is a higher gear and the second gear is a lower gear. The fact that the transmission permits two different gears affords the advantage that a higher gear can be used over the greater part of the travel of the sliding door 2 and a lower gear when the door 2 reaches a position just before the door 2 is closed. In a preferred embodiment of the invention the transmission furthermore has a neutral position, so that the drive wheel 6 can rotate freely. If the transmission has a neutral position, this affords the advantage that the door can easily be opened even when the motor or power source of the apparatus is not functioning or cannot be used, for example in the absence of power where the apparatus is powered by an electric motor. The use of a transmission with a neutral position therefore affords a significant advantage.

A position sensor 8 is connected to the sliding door 2 or arranged the door opening 4 of the vehicle 3, as shown in FIG. 2 and FIG. 3. The position sensor is designed to detect when the sliding door 2 has reached a predetermined position in the door opening. The sensor 8 is furthermore operatively connected to the transmission 7, so that the transmission 7 changes gear from the first gear to the second fear when the door 2, in moving towards a closed position, reaches the predetermined position. FIG. 2 indicates how the position sensor 8 can be located on the door 2. When the door 2 during its movement towards the closed position reaches a predetermined position close to its closed position, a projecting part of the position sensor 8 will encounter a contact in the side of the door opening. This can be used to close an electrical circuit, so that a signal is sent to the transmission or a transmission control device. FIG. 3 shows how the position sensor runs against a contact in the side of the door opening. FIG. 2 indicates how the signal can pass through a wire 50. In a preferred embodiment of the invention the wire runs through the body 33. Obviously such a wire may run both through the door 2 and through the body 33. It is advantageous, however, to lead the wire through the body, since then there is no need for a moveable wiring arrangement. The signal can also be transmitted by wireless means in a manner known in the art. It will be appreciated that the position sensor can be designed in many other ways to that described here. For example, the position sensor may consist of or comprise a photoelectric sensor fitted at a distance from the door 2 and the door opening 4. Controlling the gear of the transmission 7 as a function of the position of the door and designing the position sensor 8 to indicate this position affords the advantage that there is no need for the transmission to be pre-adjusted to a certain cable length or to lock at a certain number of revolutions of the drive wheel 6. This makes it easier to fit the apparatus to different types of vehicle of different geometries—for example door openings of different widths.

As stated above, the engaging element 5 may consist of a cable 5. This is suitably designed to run around pulleys 10 arranged on the vehicle 3 and around the drive wheel 6. Over part of its length the cable 5 can run in a casing 44 or some other guide. Embodiments are also feasible in which the engaging element takes some other form. FIG. 11 shows how the engaging element 5 may comprise a gear rack 12. The drive wheel 6 can then be a pinion.

The transmission 7 is suitably arranged in a housing 11. If the engaging element comprises or consists of a cable 5 it is advantageous to arrange the drive wheel 6 outside the housing 11 of the transmission 7.

In an advantageous embodiment of the invention the position sensor 8 is operatively connected to the transmission 7 in that when the door 2, in moving towards the closed position of the door 2, reaches a predetermined position, the position sensor 8 is designed to act upon a control device 13 for the transmission 7.

The control device 13 is designed to change from the first gear to the second gear when the position sensor 8 closes or breaks and electrical circuit 14.

Reference will now be made to FIG. 4 and to FIG. 5. In a preferred embodiment of the invention the transmission 7 is a gearbox 7. The transmission 7 then comprises an input drive shaft 15. The transmission 7 is driven by a motor 34, preferably an electric motor 34. Torque is transmitted from the electric motor 34 to the input drive shaft 15 via a transmission in the form of a pair of gearwheels 35, 36, for example. On the input drive shaft 15 there is a first gearwheel 16 and a second gearwheel 17, which is smaller than the first gearwheel 16. The first gearwheel 16 therefore constitutes a larger gearwheel and the second gearwheel 17 a smaller gearwheel. The transmission 7 further comprises an output drive shaft 18. Seated on the output drive shaft 18 is a third gearwheel 19 meshing with the first gearwheel 16 in order to provide the first gear, and a fourth gearwheel 20 meshing with the second gearwheel 17 to provide the second gear. The fourth gearwheel 20 is larger than the third gearwheel 19, so that the third gearwheel 19 constitutes a smaller gearwheel and the fourth gearwheel 20 a larger gearwheel.

Figure 6:
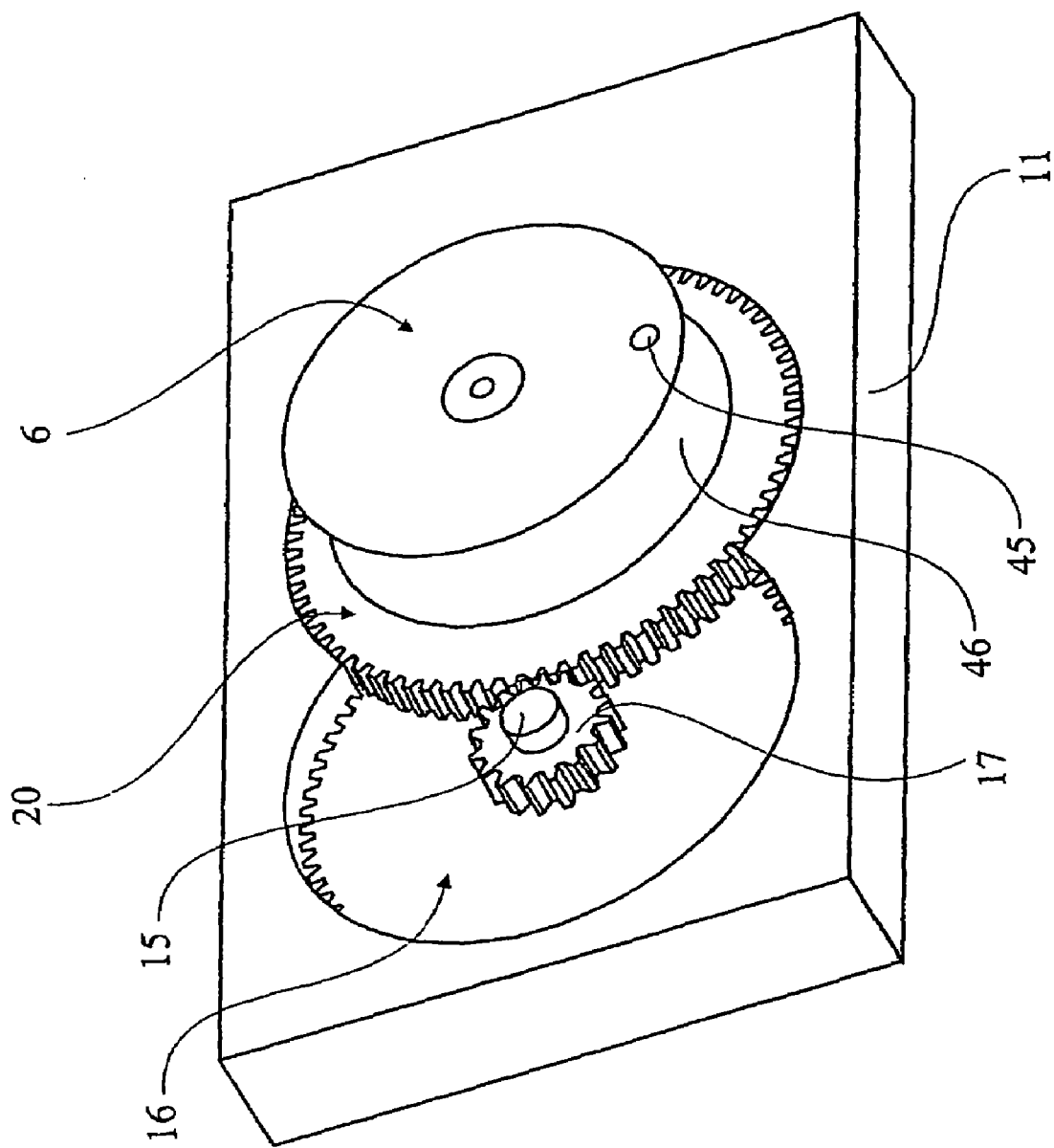
FIG. 6 shows a perspective view of another embodiment of the transmission.

A perspective view of a somewhat different embodiment of the transmission 7 is shown in FIG. 6. Compared to the embodiment shown in FIG. 4, the first gearwheel 16 has changed places with the second gearwheel 17, whilst the third gearwheel 19 has changed places with the fourth gearwheel 20. In FIG. 4, therefore, the third gearwheel 19 is shown closest to the drive wheel 6, while in FIG. 6 the fourth gearwheel 20 is shown closest to the drive wheel 6. This difference, however, is of no decisive significance for the function of the transmission.

The control device 13 is designed to control the transmission of torque from the input drive shaft 15 to the output drive shaft 18 either via the first gearwheel 16 and the third gearwheel 19 or via the second gearwheel 17 and the fourth gearwheel 20.

The control device can best be explained with reference to FIG. 5, FIG. 7a–7d and FIG. 8a–8e. The output drive shaft 18 is a hollow shaft 18. A section of the drive shaft 18 is shown in isolation in FIG. 8b. As will be seen from FIG. 8b, the drive shaft 18 is hollow and the walls thereof are provided with holes or openings 24a, 24b. The control device 13 comprises a wedge device 21 arranged inside the drive shaft 18. The wedge device 21 can best be seen from FIGS. 8a and 8c. As will be seen from FIG. 8a, the wedge device 21 takes the form of a shaft with a collar 47. The collar 47 forms a wedge directed upwards and downwards, which can be used to act upon a coupling. The wedge device 21 is moveable in the drive shaft 18 in the axial direction of the drive shaft 18. Between the output drive shaft 18 and the third gearwheel 19 there is a first coupling, which comprises coupling elements 23a arranged in the output drive shaft 18. The coupling elements 23a are designed to be pressed radially outwards through openings 24a in the output drive shaft 18 to engage with the third gearwheel 19, so that the output drive shaft 18 will thereby be torsionally locked to the third gearwheel 19. The coupling elements 23a are designed to interact with the wedge device 21, so that the wedge device 21 can press the coupling elements 23a radially outwards. Between the output drive shaft 18 and the fourth gearwheel 20 there is a second coupling. The second coupling comprises coupling elements 23b arranged in the output drive shaft 18. The coupling elements 23b are designed to be pressed radially outwards through openings 24b in the output drive shaft to engage with the fourth gearwheel 20. The output drive shaft 18 can thereby be torsionally locked to the fourth gearwheel 20. The coupling elements 23b are designed to interact with the wedge device 21 so that the wedge device 21 can press the coupling elements 23b radially outwards. In an advantageous embodiment the coupling elements 23a, 23b may consist of balls. It will be appreciated that the openings 24a, 24b in the output drive shaft 18 as shown in the figures are distributed in a circumferential direction around the drive shaft 18. Both the first coupling and the second coupling have a plurality of openings 24, only some of which can be seen from the drawings.

A further aspect of the couplings will now be explained with reference to FIG. 12. The coupling between the output drive shaft 18 and the fourth gearwheel 20 may suitably be designed as follows. In the area of the coupling the drive shaft 18 has a section 70 of larger diameter. The coupling elements or balls 23b are arranged in a row from inside and out. The outermost ball 23b is designed to engage in a recess 60 in the fourth gearwheel 20. In this area the circumference is relatively large and a large number of recesses 60 are arranged around the inside diameter of the fourth gearwheel. As a result there are many engagement positions for the coupling ball 23b. The actual point of engagement of the coupling is therefore displaced radially outwards. This design with outwardly displaced point of engagement is suitable for the coupling to the fourth gearwheel 20, since the gearwheel is larger than the third gearwheel 19. As indicated in FIG. 12, there are three rows of coupling balls 23b, the rows forming 120° angles with one another. As indicated by the dashed line in FIG. 12, the coupling for the third gearwheel 19 may be situated more radially inwards and offset by an angle of 60° in relation to the coupling for the fourth gearwheel.

The control device 13 furthermore comprises means of displacing the wedge device 21 axially in the output drive shaft 18, so that the wedge device 21 can actuate either the first or the second coupling. The said means of the control device 13 for displacing the wedge device axially comprise a shuttle 27, which is moveable in a direction perpendicular to the axial direction of the drive shaft 18. On either side of the shuttle 27 is an electromagnet 28, which is designed to attract the shuttle 27. Seated on the wedge device 21 is a pin 29 and on the shuttle 27 there is a first groove 30 having an extension both parallel to the output drive shaft and perpendicular thereto. In FIG. 5 and FIG. 7a-7c, for example, the first groove 30 is shown as a straight groove, which is inclined at 45° to the drive shaft 18 so that the groove thereby has an extension both parallel to the output drive shaft 18 and perpendicular thereto. Another angle of the first groove 30 or some other shape of the first groove 30 is also feasible, however, such as a curved groove, for example. The pin 29 of the wedge device 21 is designed to engage in the first groove 30. A fixed guide plate 31 is provided with a second groove 32, which extends parallel to output drive shaft 18. The guide plate 31, as is basically shown in FIG. 8e, may be fixed to the transmission housing 11. The pin 29 of the wedge device 21 is designed to engage also in the second groove 32, so that movement of the shuttle 27 perpendicular to the axial direction of the drive shaft 18 displaces the wedge device 21 axially in the output drive shaft 18. It will be appreciated that when the shuttle 27 moves perpendicularly to the drive shaft 18, the pin 21 is prevented from moving in the same direction since it is located in the second groove 32. The first groove 30 of the shuttle will then force the wedge device 21 to move axially in the drive shaft 18. It will be realised that two guide plates 31 with grooves 32 may be used and that the shuttle 27 may have two walls, each of which has a groove that has an extension both parallel to the output drive shaft and perpendicular thereto. The pin 29 of the wedge device is then designed to engage in grooves on two different sides of the wedge device 21, as can be seen from FIG. 8c. This provides a more reliable guidance.

FIG. 7a shows how the wedge device 21 is located in the drive shaft 18. Coupling elements in the form of balls 23a, 23b are located in drive shaft openings 24a, 24b. The collar 47 of the wedge device 21 is situated between the openings 24a, 24b. The upper openings 24b are arranged at a certain distance from the lower openings 24a ("upper" and "lower" here signify only that the openings 24b are "upper" openings in FIG. 8a and that the openings 24a are lower openings in the figures). The fact that the openings for the first and the second coupling are arranged at a distance from one another means that there is an intermediate position. The drive shaft 18 here does not engage either with the third gearwheel 19 or with the fourth gearwheel 20. The transmission 7 is therefore situated in a neutral position. In this position the shuttle 27 is situated midway between the two electromagnets 28 as shown in FIG. 5. Such a neutral position may result from an absence of current when neither of the two electromagnets 28 is active.

FIG. 7b shows a situation in which the shuttle 27 is displaced to the left in the figure. This position occurs when the left-hand electromagnet 28 in FIG. 5 is activated whilst the right-hand electromagnet 28 in FIG. 5 is switched off. As a result of the displacement of the shuttle 27, the pin 29 of the wedge device has been forced upwards due to its engagement in the grooves 30, 32. The entire wedge device 21 then moves upwards and the position of the collar 47 of the wedge device then presses the upper coupling elements or the balls 23b out through the openings 24b in the drive shaft 18. The shaft 18 is thereby coupled to the fourth gearwheel 20, since the balls 23b will engage with both the drive shaft 18 and the fourth gearwheel 20, so that the drive shaft 18 is torsionally locked to the further gearwheel 20.

FIG. 7c shows a position in which the shuttle 27 has been displaced to the right in the figure. This position occurs where the right-hand electromagnet 28 in FIG. 5 is activated while the left-hand electromagnet 28 is disconnected. As a result of the displacement of the shuttle 27, the pin 29 of the wedge device has been forced downwards and the wedge device 21 and the collar 47 have therefore also been forced downwards. In FIG. 7c therefore the collar 47 is shown in a position in which the collar 47 has forced the lower coupling elements or the balls 23a out through the openings 24a in the drive shaft 18. The drive shaft 18 is then torsionally locked to the third gearwheel 19, since the balls 23a engage with both the drive shaft 18 and the third gearwheel 19. When the coupling elements 23a, 23b are not being forced outside the collar 47 of the wedge device 21 they return to a disengaged position by virtue of the fact that they are spring-loaded, for example.

The position sensor 8 is connected to the electromagnets so that each electromagnet 28 is activated or deactivated as a function of the position of the sliding door 2. One possible embodiment of the position sensor 8 will now be explained with reference to FIG. 13–FIG. 16.

Figure 14:
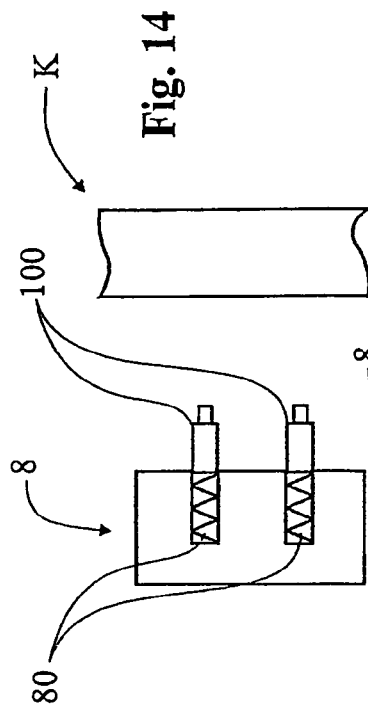
FIG. 14–16 show a schematic diagram of a possible embodiment of the position sensor.
Figure 15:
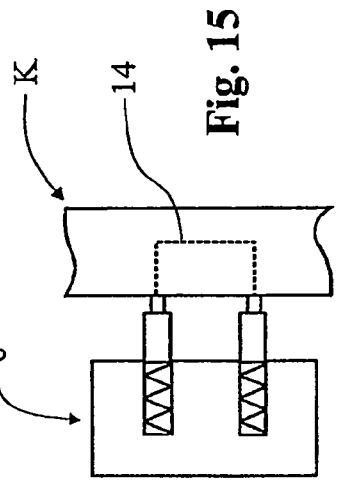
Figure 16:
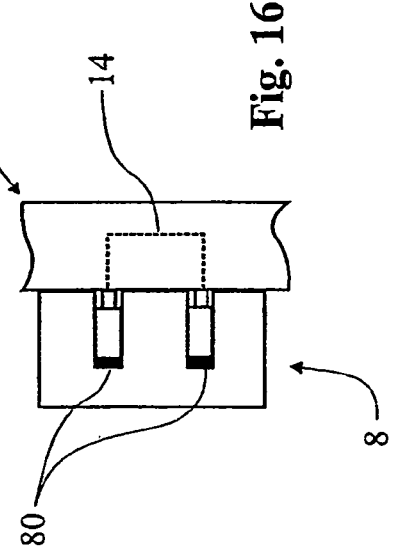
Figure 13:
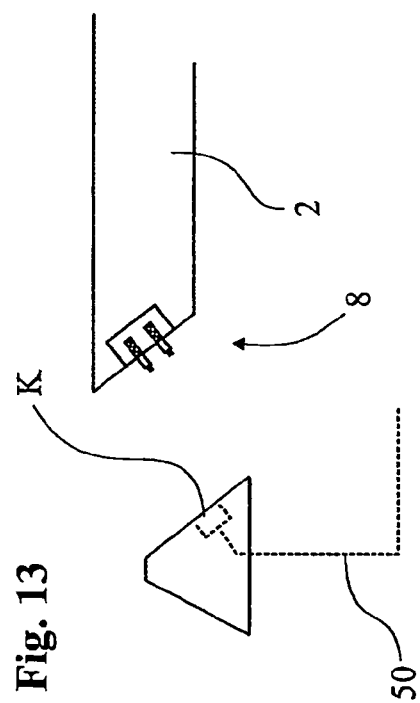
FIG. 13 shows some of the parts shown FIG. 1 and FIG. 2 on a larger scale.

FIG. 13 shows the door 2 in a position in which the door is in proximity to the closed position. On the end of the door 2 there is a position sensor 8, which when the door is closed will run against the door frame against a contact K. FIG. 14 shows that the position sensor 8 comprises contact pins 100, the said contact pins 100 being designed to be pressed into the position sensor 8 against the force of springs 80, for example coil springs 80. The contact pins 100 are of a length, which is selected so that when the door 2 attains its predetermined position the contact pins reach the contact K in the door frame on the body 33. FIG. 15 shows how the contact pins 100 have reached the contact K. The door is now in the predetermined position and it is time to change gear. The contact pins 100 can now close or break an electrical circuit 14. A signal is sent through the wire 50 and the gear is changed. FIG. 16 shows how the door 2 has been closed. The contact pins 100 of the position sensor 8 have now been pressed into the position sensor 8 and the springs 80 compressed.

The invention also relates to a vehicle 3 having a body 33. The vehicle body 33 is designed so that the body 3 defines a door opening 4. The vehicle furthermore comprises a door 2, the door 2 being designed to slide in the door opening 4 between an open position of the door 2 and a closed position. The vehicle 3 further comprises an apparatus for opening and closing the sliding door 2. The said apparatus comprises a cable 5, which is connected to the door 2 and is designed to run around pulleys 10 arranged on the vehicle 3, and a drive wheel 6 designed to act on the cable 5.

A gearbox 7 is operatively connected to the drive wheel and the transmission is designed to transmit power to the drive wheel 6 via at least a first gear and a second gear so that the drive wheel 6 can be driven in a first gear and a second gear. The first gear is a higher gear and the second gear is a lower gear. In a preferred embodiment of the invention the transmission 7 has a neutral position so that the drive wheel 6 can rotate freely. A position sensor 8 is arranged in connection with the sliding door 2 or in the door opening 4 of the vehicle 3 and is more specifically designed to detect when the sliding door 2 has reached a predetermined position in the door opening 4. The sensor 8 is operatively connected to the transmission 7, so that the transmission 7 changes gear from the first gear to the second gear when the door 2, in moving towards a closed position, reaches the predetermined position.

In a preferred embodiment the transmission 7 is arranged in a housing 11 and the drive wheel 6 is arranged outside the housing 11 of the transmission 7.

The invention finally relates to a method of fitting an apparatus 1 for opening and closing a door 2. The method consists of providing a vehicle 3 with a door opening 4, in which a door is designed to slide between an open position and a closed position. The method further consists of providing a cable 5 together with pulleys 10 intended for the cable 5. The said cable 5 and pulleys 10 are fitted to the vehicle 3 so that the cable 5 is arranged on the vehicle 3 to run around the pulleys 10. A drive wheel 6 is furthermore provided and the said drive wheel 6 is fitted to the vehicle 3 for interaction with the cable 5. A transmission 7 is provided, the said transmission 7 having a first gear and a second gear and the said transmission 7 preferably also having a neutral position. The transmission 7 is fitted in connection with the drive wheel 6 in such a way that the transmission 7 is operatively connected to the drive wheel 6, so that the drive wheel 6 can be driven in a first gear or a second gear or can rotate freely in the neutral position if the transmission is a transmission which has a neutral position. A control device is provided and the control device is fitted in connection with the transmission 7, so that the control device can act on the transmission 7 in order to change its gear from the first gear to the second gear. A position sensor 8 is fitted in the door opening 4 and a connection is established between the position sensor 8 and the control device, so that the control device is activated by the position sensor 8 when the sliding door 2 has reached a certain position.

The apparatus according to the invention functions as follows. When the door 2 is in an open position—see FIG. 2—the motor 34 is activated in order to close the door. A rapid movement with low force is desirable. A high gear is therefore used. The high gear is obtained in that torque is transmitted from the electric motor 34 to the input shaft 15.

Figure 5:
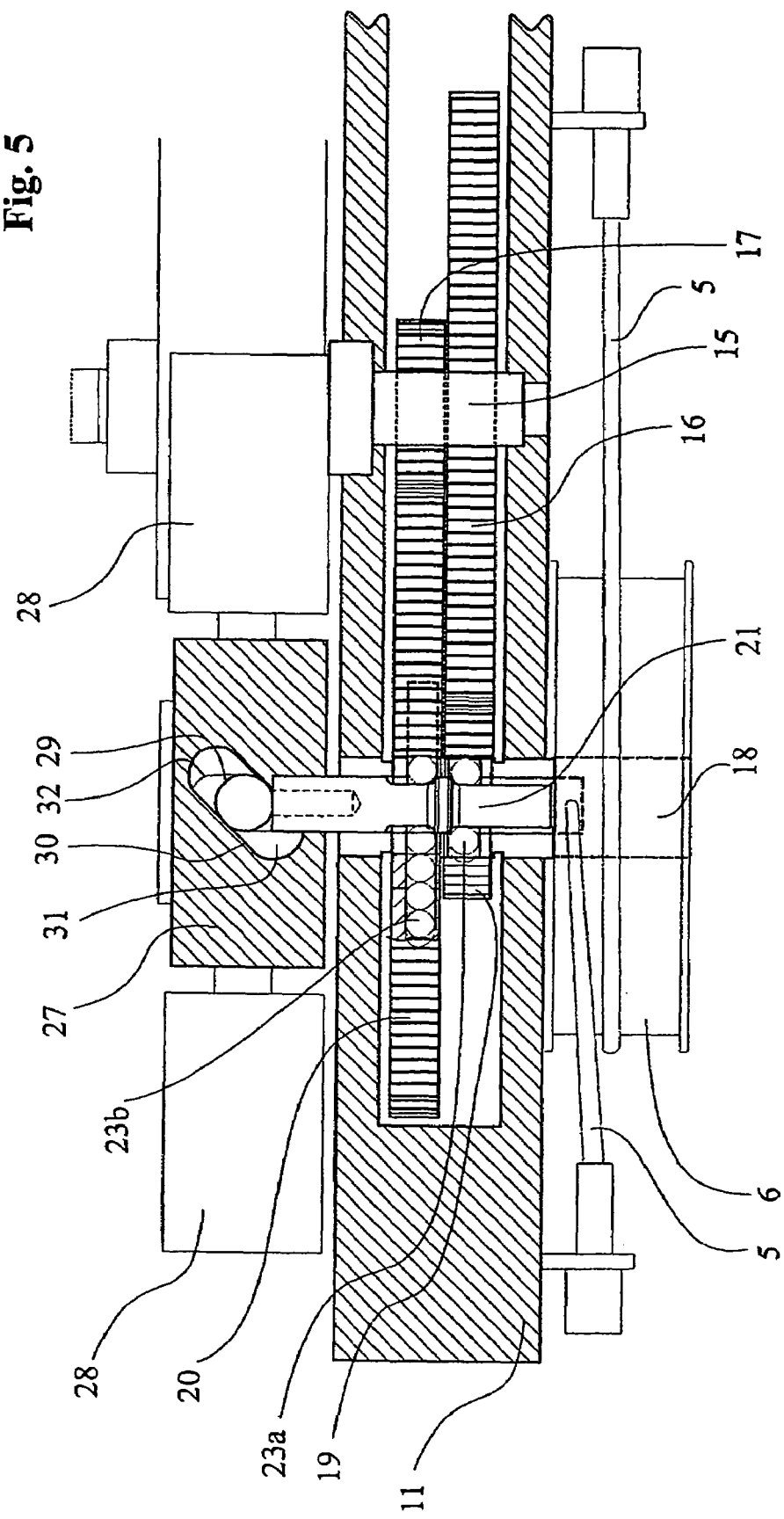
FIG. 5 shows the design of the control device.

The shuttle 27 of the control device is then in a position to the right of the position shown in FIG. 5. The electromagnet 28, which in FIG. 5 is shown as the right-hand electromagnet is now activated in order to attract the shuttle 27 to it. The wedge device 21 is then in the position shown in FIG. 7c. This means that the first coupling between the output drive shaft 18 and the third gearwheel 19 is activated. Torque is then transmitted from the relatively large first gearwheel 16 on the input shaft 15 to the relatively small third gearwheel 19 on the output shaft. The output drive shaft 18 then drives the drive wheel 6 in a high gear. The cable 5 running around the drive wheel will then move and will draw the carriage 39 and hence the door 2 with it. When the door 2 has almost reached its limit position, the position sensor 8 will run against its contact at the edge of the door opening. The door 2 may then form a very small gap with the door opening. The gap may be so small that it is difficult to insert a finger into the gap. For example, the gap may be approximately 1 cm. When the position sensor 8 runs against its contact an electrical circuit is closed or broken and a signal is sent to the control device. The electromagnet which has hitherto been activated will then be shut off and the second electromagnet will be activated instead. The shuttle 27 will then be drawn towards the position shown in FIG. 7b. Consequently the second coupling, that between the output drive shaft 18 and the fourth gearwheel 20, is now activated. Torque is then transmitted from the relatively small second gearwheel 17 on the input drive shaft 15 via the relatively large fourth gearwheel 20. The output drive shaft 18 then drives the drive wheel 6 in a low gear so that the door 2 can be closed with great force. In the absence of electrical current both of the electromagnets will be shut off and the shuttle will come to rest in its intermediate position. The shuttle is suitably provided with a weak spring, which endeavours to bring the shuttle into its intermediate position. The transmission then assumes the neutral position.

The invention provides an apparatus for closing and opening a sliding door which over the greater part of its travel can move rapidly but with little force and which can be closed with great force.

If the drive wheel 6 is arranged outside the housing 7 of the transmission, this affords the advantage, among other things, that the cable 5 can be drawn away from the transmission in any direction. This provides freedom of choice when fitting the apparatus according to the invention, which can be more easily fitted to different types of vehicle.

Designing the position sensor 8 to act upon a control device 13 for the transmission 7 affords the advantage, among other things, that an operative connection is obtained between the position sensor and the transmission, so that a signal from the position sensor can determine the gear.

Designing the control device 13 to change from the first gear to the second gear when the position sensor 8 closes or breaks an electrical circuit affords the advantage, among other things, that the change of gear can be performed as a function of a clearly defined signal. The electrical arrangement with an electrical circuit and electromagnets furthermore has the advantage that the control device can automatically shift the transmission into the neutral position in the absence of current.

The hollow design of the output drive shaft 18, and the design of the wedge device according to the invention with its collar 47 afford the advantage, among other things, that the wedge device 21, through its axial movement in the output drive shaft 18, can activate either the first coupling or the second coupling Arranging the openings in the drive shaft 18 for the first and second coupling at a distance from one another affords the advantage that there is an intermediate position for the wedge device in which the collar of the wedge device does not activate either coupling. This provides a neutral position for the transmission.

If the transmission is a gearbox, this affords the advantage, among other things, that a reliable function is obtained. Some other transmission, such as a belt transmission, is also feasible, however.

The drive wheel 6 may be provided with grooves for the cable 5.

The invention claimed is:

1. Apparatus for opening and closing a door which is arranged on a vehicle so that it can slide in a door opening in the vehicle, the apparatus comprising:
   a) an engaging element connected to the door,
   b) a drive wheel designed to act upon the engaging element,
   c) a transmission operatively connected to the drive wheel, the transmission being designed to transmit power to the drive wheel via at least a first gear and a second gear so that the drive wheel can be driven in a first gear and a second gear, the first gear being a higher gear and the second gear being a lower gear,
   d) a position sensor connected to the sliding door or arranged in the door opening of the vehicle and designed to detect when the sliding door has reached a predetermined position in the door opening, said sensor being operatively connected to the transmission, so that the transmission changes gear from the first gear to the second gear when the door, in moving towards a closed position, reaches the predetermined position, wherein the engaging element comprises a cable designed to run around pulleys arranged on the vehicle and around the drive wheel, that the transmission is arranged in a housing and that the drive wheel is arranged outside the housing of the transmission.

2. Apparatus according to claim 1, wherein the transmission furthermore has a neutral position so that the drive wheel can rotate freely.

3. Apparatus for opening and closing a door which is arranged on a vehicle so that it can slide in a door opening in the vehicle, the apparatus comprising:
   a) an engaging element connected to the door,
   b) a drive wheel designed to act upon the engaging element,
   c) a transmission operatively connected to the drive wheel, the transmission being designed to transmit power to the drive wheel via at least a first gear and a second gear so that the drive wheel can be driven in a first gear and a second gear, the first gear being a higher gear and the second gear being a lower gear,
   d) a position sensor connected to the sliding door or arranged in the door opening of the vehicle and designed to detect when the sliding door has reached a predetermined position in the door opening, said sensor being operatively connected to the transmission, so that the transmission changes gear from the first gear to the second gear when the door, in moving towards a closed position, reaches the predetermined position, wherein the engaging element comprises a gear rack and that the drive wheel is a pinion.

4. Apparatus according to claim 1, wherein the position sensor is operatively connected to the transmission in that when the door, in moving towards the closed position of the door, reaches the predetermined position, the position sensor is designed to act upon a control device for the transmission.

5. Apparatus according to claim 4, wherein the control device is designed to change from the first gear to the second gear when the position sensor closes or breaks an electrical circuit.

6. Apparatus according to claim 5, wherein the transmission is a gearbox which comprises:
   a. an input drive shaft,
   b. on the input drive shaft, a first gearwheel,
   c. on the input drive shaft, a second gearwheel, which is smaller than the first gearwheel so that the first gearwheel constitutes a larger gearwheel and the second gearwheel constitutes a smaller gearwheel,
   d. an output drive shaft,
   e. on the output drive shaft, a third gearwheel meshing with the first gearwheel to produce the first gear,
   f. on the output drive shaft, a fourth gearwheel, meshing with the second gearwheel to produce the second gear, said fourth gearwheel being larger than the third gearwheel, so that the third gearwheel constitutes a smaller gearwheel and the fourth gearwheel constitutes a larger gearwheel.

7. Apparatus according to claim 6, wherein the control device is designed to control the transmission of torque from the input drive shaft to the output drive shaft either via the first gearwheel and the third gearwheel or via the second gearwheel and the fourth gearwheel.

8. Apparatus for opening and closing a door which is arranged on a vehicle so that it can slide in a door opening in the vehicle, the apparatus comprising:
   a) an en a in element connected to the door,
   b) a drive wheel designed to act upon the engaging element,
   c) a transmission operatively connected to the drive wheel, the transmission being designed to transmit power to the drive wheel via at least a first gear and a second gear so that the drive wheel can be driven in a first gear and a second gear, the first gear being a higher gear and the second gear being a lower gear,
   d) a position sensor connected to the sliding door or arranged in the door opening of the vehicle and designed to detect when the sliding door has reached a predetermined position in the door opening, said sensor being operatively connected to the transmission, so that the transmission changes pear from the first pear to the second pear when the door, in moving towards a closed position, reaches the predetermined position,
   wherein the position sensor is operatively connected to the transmission in that when the door, in moving towards the closed position of the door, reaches the predetermined position, the position sensor is designed to act upon a control device for the transmission, wherein the control device is designed to change from the first gear to the second gear when the position sensor closes or breaks an electrical circuit, wherein the transmission is a gearbox which comprises,
   an input drive shaft,
   on the input drive shaft, a first gearwheel,
   on the input drive shaft, a second gearwheel, which is smaller than the first gearwheel so that the first gearwheel constitutes a larger gearwheel and the second gearwheel constitutes a smaller gearwheel,
   an output drive shaft,
   on the output drive shaft, a third gearwheel meshing with the first gearwheel to produce the first gear,
   on the output drive shaft, a fourth gearwheel, meshing with the second gearwheel to produce the second gear, said fourth gearwheel being larger than the third gearwheel, so that the third gearwheel constitutes a smaller gearwheel and the fourth gearwheel constitutes a larger gearwheel, wherein the control device is designed to control the transmission of torque from the input drive shaft to the output drive shaft either via the first gearwheel and the third gearwheel or via the second gearwheel and the fourth gearwheel, and wherein the output drive shaft is a hollow shaft and that the control device comprises:
   a wedge device which is arranged inside the drive shaft and is moveable in the drive shaft in the axial direction of the drive shaft,
   a first coupling between the output drive shaft and the third gearwheel, the coupling comprising coupling elements arranged in the output drive shaft and designed to be pressed radially outwards through openings in the output drive shaft to engage with the third gearwheel, so that the output drive shaft is thereby torsionally locked to the third gearwheel, and the coupling elements being designed to interact with the wedge device so that the wedge device can press the coupling elements radially outwards,
   a second coupling between the output drive shaft and the fourth gearwheel, the second coupling comprising coupling elements which are arranged in the output drive shaft and are designed to be pressed radially outwards through openings in the output drive shaft to engage with the fourth gearwheel, so that the output drive shaft is thereby torsionally locked to the fourth gearwheel, and the coupling elements being designed to interact with the wedge device so that the wedge device can press the coupling elements radially outwards, and
   means for displacing the wedge device axially in the output drive shaft, so that the wedge device can actuate either the first coupling or the second coupling.

9. Apparatus according to claim 8, wherein the means of the control device for displacing the wedge device axially comprise:
   a) a shuffle moveable in a direction perpendicular to the axial direction of the drive shaft,
   b) on either side of the shuffle an electromagnet which is designed to attract the shuttle,
   c) on the wedge device, a pin,
   d) on the shuttle, a first groove having an extension both parallel to the output drive shaft and perpendicular thereto and in which first groove the pin of the wedge device is designed to engage,
   e) at least one fixed guide plate having a second groove having an extension parallel to the output shaft, and in which second groove the pin of the wedge device is arranged so that movement of the shuttle perpendicular to the axial direction of the drive shaft displaces the wedge device axially in the output drive shaft.

10. A vehicle having a body, the vehicle body being designed so that a door opening is defined by the body and a door, the door being designed to slide in the door opening between an open position of the door and a closed position, and the vehicle further comprising an apparatus for opening and closing the sliding door, the said apparatus comprising:
   a. a cable which is connected to the door and is designed to run around pulleys arranged on the vehicle,
   b. a drive wheel designed to act on the cable, c. a transmission, preferably a gearbox, the transmission being operatively connected to the drive wheel and being designed to transmit power to the drive wheel via at least a first gear and a second gear so that the drive wheel can be driven in a first gear and a second gear, the first gear being a higher gear and the second gear being a lower gear, d. a position sensor which is connected to the sliding door or arranged in the door opening of the vehicle and which is designed to detect when the sliding door has reached a predetermined position in the door opening, the sensor being operatively connected to the transmission, so that the transmission changes gear from the first gear to the second gear when the door, in moving towards a closed position, reaches the predetermined position.

11. Vehicle according to claim 10, wherein the transmission furthermore has a neutral position so that the drive wheel can rotate freely.

12. Vehicle according to claim 11, wherein the transmission is arranged in a housing and that the drive wheel is arranged outside the housing of the transmission.

13. Method of fitting an apparatus for opening and closing a door, the method comprising the following steps:

a. providing a vehicle with a door opening in which a door is designed to slide between an open position and a closed position, b. providing a cable together with pulleys intended for the cable, c. fitting said cable and pulleys to the vehicle so that the cable is arranged on the vehicle to run around the pulleys, d. providing a drive wheel, e. fitting the drive wheel to the vehicle for interaction with the cable, f. providing a transmission having a first gear and a second gear, g. fitting of the transmission in connection with the drive wheel so that the transmission is operatively connected to the drive wheel, so that the drive wheel can be driven in a first gear and a second gear, h. providing a control device, i. fitting of the control device in connection with the transmission so that the control device can act on the transmission in order to change its gear from the first gear to the second gear, j. providing a position sensor, k. fitting of the position sensor in the door opening and establishing of a connection between the position sensor and the control device so that the control device is activated by the position sensor when the sliding door has reached a certain position.

14. Method according to claim 13, wherein the transmission has a neutral position so that the drive wheel can be driven in a first gear and a second gear or can rotate freely in a neutral position.

15. Apparatus according to claim 8, wherein the position sensor is connected to the electromagnets so that each electromagnet is activated or deactivated as a function of the position of the sliding door.

* * * * *